United States Patent
Sato et al.

(10) Patent No.: US 10,661,537 B2
(45) Date of Patent: May 26, 2020

(54) BIAXIALLY DRAWN COLORED POLYESTER FILM FOR LAMINATING METAL SHEET

(71) Applicant: TEIJIN FILM SOLUTIONS LIMITED, Tokyo (JP)

(72) Inventors: Takatoshi Sato, Tokyo (JP); Shinichiro Okada, Tokyo (JP)

(73) Assignee: TEIJIN FILM SOLUTIONS LIMITED, Tokyo (JP)

( * ) Notice: Subject to any disclaimer, the term of this patent is extended or adjusted under 35 U.S.C. 154(b) by 231 days.

(21) Appl. No.: 15/736,848

(22) PCT Filed: Jul. 22, 2016

(86) PCT No.: PCT/JP2016/071573
§ 371 (c)(1),
(2) Date: Dec. 15, 2017

(87) PCT Pub. No.: WO2017/022526
PCT Pub. Date: Feb. 9, 2017

(65) Prior Publication Data
US 2018/0361715 A1 Dec. 20, 2018

(30) Foreign Application Priority Data
Jul. 31, 2015 (JP) .................... 2015-152276

(51) Int. Cl.
| | | |
|---|---|---|
| B32B 7/02 | (2019.01) | |
| B32B 27/08 | (2006.01) | |
| B32B 27/36 | (2006.01) | |
| B32B 27/20 | (2006.01) | |
| B32B 15/09 | (2006.01) | |

(52) U.S. Cl.
CPC ............ *B32B 27/08* (2013.01); *B32B 7/02* (2013.01); *B32B 15/09* (2013.01); *B32B 27/20* (2013.01); *B32B 27/36* (2013.01); *B32B 2307/518* (2013.01); *B32B 2439/00* (2013.01)

(58) Field of Classification Search
CPC ............ B32B 15/09; B32B 2307/518; B32B 2439/00; B32B 27/08; B32B 27/36
See application file for complete search history.

(56) References Cited

U.S. PATENT DOCUMENTS 5,055,346 A * 10/1991 Rohrbacher ............ B32B 27/08
428/216

FOREIGN PATENT DOCUMENTS

| | | |
|---|---|---|
| JP | 11-254624 A | 9/1999 |
| JP | 11-342577 A | 12/1999 |
| JP | 11-348218 A | 12/1999 |
| JP | 2000-37836 A | 2/2000 |
| JP | 2004-130536 A | 4/2004 |
| JP | 2004-203905 A | 7/2004 |
| JP | 2010-126701 A | 6/2010 |
| JP | 2014-8739 A | 1/2014 |
| WO | 2013/002323 A1 | 3/2013 |

OTHER PUBLICATIONS

Kinoshita et al (JP 2004130536 A machine translation), dated Apr. 2004. (Year: 2004).*
International Search Report for PCT/JP2016/071573 dated Oct. 25, 2016 [PCT/ISA/210].
Communication dated Jun. 4, 2019, from the Japanese Patent Office in counterpart application No. 2015-152276.
Decision of Refusal dated Dec. 5, 2019 from the Japanese Patent Office in application No. 2015-152276.

* cited by examiner

*Primary Examiner* — Lawrence D Ferguson
(74) *Attorney, Agent, or Firm* — Sughrue Mion, PLLC

(57) ABSTRACT

[Problem] To provide a biaxially drawn colored polyester film for laminating and forming metal sheet that: exhibits excellent formability such that even under severe processing or high-temperature heat treatments, the film is prevented from chipping or cracks during forming into a can etc.; and yields formed articles such as cans that have excellent concealability, appearance, and printability.

[Solution] The invention is arrived at using a biaxially drawn colored polyester film for laminating and forming metal sheet. Said film comprising at least two layers of: a surface layer (layer A) mainly composed of a polyester having a melting point TmA of 230 to 260° C., layer A having a coloring pigment with an amount of 10 wt % or less, a polymer component with intrinsic viscosity of 0.46 or more, and a water contact angle of 70 to 120° on an outer surface; and a substrate layer (layer B) mainly composed of a polyester having a melting point TmB of 230 to 260° C. and a coloring pigment, layer B having a polymer component with intrinsic viscosity of 0.46 or more and the coloring pigment with an amount of more than 10 wt % and 50 wt % or less; wherein |TmB−TmA| is 4° C. or less.

20 Claims, No Drawings

BIAXIALLY DRAWN COLORED POLYESTER FILM FOR LAMINATING METAL SHEET

CROSS REFERENCE TO RELATED APPLICATIONS

This application is a National Stage of International Application No. PCT/JP2016/071573 filed on Jul. 22, 2016 (which claims priority from Japanese Patent Application No. 2015-152276 filed on Jul. 31, 2015), the contents of which are incorporated herein by reference in their entirety.

TECHNICAL FIELD

The present invention relates to a biaxially drawn colored polyester film for laminating and forming metal sheet.

BACKGROUND ART

Metal cans are generally coated in order to prevent corrosion of the inner and outer surfaces. In recent years, for the purposes of simplifying the process, improving hygiene, preventing pollution, etc., a method in which a metal can is laminated with a thermoplastic resin film, such as a polyester film, has been performed for imparting rust resistance without using an organic solvent. That is, a thermoplastic resin film is laminated on a metal sheet of tin, tin-free steel, aluminum, or the like, and then used for food can, beverage can, or aerosol can applications in which cans are subjected to severe forming processing, such as in the case of drawn cans and thin-drawn cans. In terms of cost reduction, cans for these applications have been produced through thin-drawing and ironing under even severer processing conditions.

In the case where such severe forming processing is performed, with the thinning of the metal sheet, the resin film is also thinned. The outer surface of a food can or a beverage can is generally printed in order to improve the design features. In a can formed from a resin film-laminated metal sheet, a resin film containing white or various color pigments is laminated on the metal sheet, and the laminated sheet is used as the printing substrate in order to conceal the color of the metal sheet. In the case where such a laminated metal sheet is subjected to severe processing, the resin thickness significantly decreases, wherein the absolute quantity of the added pigment in the thickness direction decreases, resulting in a problem in that the substrate does not exhibit sufficient concealability. In the case where a large amount of pigment is previously added to the resin film with forethought of this problem, the strength of the resin film decreases. Accordingly, the resin film becomes easily chipped off or scratched during processing, and it further happens that the resin film cracks and peels off. Thus, it is difficult to improve the concealability while keeping the strength of the laminating resin film high at the same time.

For example, a method in which a biaxially drawn polyester film is laminated on a metal sheet, and the laminate is used as a material for can manufacturing, has been proposed (PTL 1). However, when forming is performed through severer processing, the resin film is chipped off or scratched, or may break in an extreme case. In addition, a method in which an undrawn polyester film is laminated on a metal sheet, and the laminate is used as a material for can manufacturing, has been proposed (PTL 3). However, undrawn films are extremely brittle and thus easily cut during film forming or handling, leading to the problem of poor productivity.

In order to solve these problems, PTL 4 proposes a biaxially drawn colored laminate film composed of a surface layer made of a high-polymerization-degree copolyester and a back layer made of a copolyester containing a high concentration of a colorant. With this film, it is certainly possible to achieve both concealability and strength of the resin film at the same time.

However, in recent years, for the purpose of reducing damage to the film in a subsequent forming processing after relaxing the stress accompanying the strain applied to the film of a laminated metal sheet, heat treatment is performed in the course of a series of can manufacturing steps. In the heat treatment, in order to balance with the enamel rater value that indicates the presence/absence of coating defects in a polyester film for laminating the can inner surface, a higher heat treatment temperature has been required. However, this causes appearance defects in the film as a new problem, and there has been a demand for its solution.

CITATION LIST

Patent Literature

[PTL 1] Japanese Unexamined Patent Application Publication No. Hei 11-342577
[PTL 2] Japanese Unexamined Patent Application Publication No. 2000-37836
[PTL 3] Japanese Unexamined Patent Application Publication No. Hei 11-348218
[PTL 4] WO 2013/002323

SUMMARY OF INVENTION

Technical Problem

In more recent years, for the purpose of cost reduction, sheet thickness has been reduced, and accordingly, can manufacturing steps have been improved. The can manufacturing process has become to be performed under severer conditions, and the load applied on the film has become larger.

Since printing is performed on the surface, printability is also required.

The present invention has been made under the above background, and an object of the present invention is to provide a biaxially drawn colored polyester film for laminating and forming metal sheet, which exhibits excellent formability such that even in the case where the film is subjected to severe processing or high-temperature heat treatment as described above, the film is prevented from being chipped off or cracked during forming into a can after lamination; and from which a formed product, such as a can, having excellent concealability, appearance, and printability is obtained.

Solution to Problem

According to the research by the present inventors, it has been found that the above problems can be solved by the following configuration.

[1] A biaxially drawn colored polyester film for laminating and forming metal sheet, comprising at least two layers of:
a surface layer (layer A) mainly composed of a polyester having a melting point of 230 to 260° C., layer A having a polymer component with intrinsic viscosity of 0.46 or more, a coloring pigment with an amount of 10 wt % or less, and a water contact angle on an outer surface of 70 to 120°; and a substrate layer (layer B) mainly composed of a polyester having a melting point of 230 to 260° C. and a coloring pigment, layer B having a polymer component with intrinsic viscosity of 0.46 or more and the coloring pigment with an amount of more than 10 wt % and 50 wt % or less;
wherein the melting points of the polyesters of layer A and layer B satisfy the following expression (1):

$$|TmB-TmA| \leq 4° C. \qquad (1)$$

wherein TmA represents the melting point of the polyester of layer A, and
TmB represents the melting point of the polyester of layer B.
[2] The biaxially drawn colored polyester film for laminating and forming metal sheet according to [1], wherein the polyester constituting layer B is a copolyester having a melting point of 230 to 250° C.
[3] The biaxially drawn colored polyester film for laminating and forming metal sheet according to [1] or [2], wherein the polyester constituting layer A is a copolyester having a melting point of 230 to 250° C.
[4] The biaxially drawn colored polyester film for laminating and forming metal sheet according to [1], wherein the polyesters each constituting layer A and layer B each are a copolyester having a melting point of 230 to 250° C., and an isophthalic acid-copolymerized polyethylene terephthalate.
[5] The biaxially drawn colored polyester film for laminating and forming metal sheet according to any one of [1] to [4], wherein layer A contains 0.2 to 2.0 wt % of a wax based on the weight of layer A.
[6] The biaxially drawn colored polyester film for laminating and forming metal sheet according to [5], wherein the wax is a polyethylene wax having a dropping point of 120 to 140° C.
[7] The biaxially drawn colored polyester film for laminating and forming metal sheet according to any one of [1] to [6], wherein the film is laminated on a surface of a metal sheet that will become the outer surface of a container.

Advantageous Effects of Invention

The biaxially drawn colored polyester film for laminating and forming metal sheet of the present invention exhibits excellent formability such that during forming into a can after lamination on the metal sheet, the film on the can wall is hard to be chipped off or cracked, and furthermore, after forming, has excellent concealability, appearance of a formed product such as a can, and printability.

DESCRIPTION OF EMBODIMENTS

Hereinafter, the invention will be described in detail.
A biaxially drawn colored polyester film for laminating and forming metal sheet of the present invention is a laminate film comprising at least two layers: a surface layer (layer A) and a substrate layer (layer B).
The surface layer (layer A) is mainly composed of a polyester having a melting point of 230 to 260° C. The term "mainly composed of" indicates that the total amount of the polyester is, for example, 80 wt % or more, preferably 85 wt % or more, more preferably 90 wt % or more, and still more preferably 95 wt % or more, based on the weight of layer A.
The substrate layer (layer B) is mainly composed of a polyester having a melting point of 230 to 260° C. and a coloring pigment. The term "mainly composed of" indicates that the total amount of the polyester and the coloring pigment is, for example, 80 wt % or more, preferably 85 wt % or more, more preferably 90 wt % or more, and still more preferably 95 wt % or more, based on the weight of layer B.

When the melting points of the polyester of layer A and that of layer B are within the ranges described above, the film has excellent formability. When the melting points are lower than the above melting point ranges, film chipping occurs during forming processing. On the other hand, when the melting points are higher than the above ranges, cracks occur.

The biaxially drawn polyester film of the present invention comprises at least two layers of layer A and layer B, and examples of the structure include a two-layer structure of layer A/layer B and a three-layer structure of layer A/layer B/layer A. Furthermore, the film may include a layer in addition to layer A and layer B as long as the object of the present invention is not disturbed. In such a case, at least one surface of the film should be layer A.

The polyester constituting the surface layer (layer A) and the substrate layer (layer B) may be a homopolyester or a copolyester as long as the above-described melting point requirements are satisfied. A preferable example of the homopolyester includes homopolyethylene terephthalate. As the copolyester, any of polyethylene terephthalate copolymers, polyethylene-2,6-naphthalate copolymers, or blends of these or the above-described homopolyester and polybutylene terephthalate may be used. Of these, polyethylene terephthalate copolymers are preferred.
(Homopolyester)
In the present invention, a preferable example of the polyester constituting layer A and/or layer B includes a polyester having a melting point in the range of more than 250° C. to 260° C. or less. Employment of such a polyester provides several formability effects and among them, an effect of preventing film chipping during forming is especially excellent. When the melting point is excessively high, the film will have poor formability in terms of inability to track drawing during can manufacturing, and cracks will occur in the film. On the other hand, when the melting point is low, the improving effect of preventing film chipping tends to become low. From such viewpoints, the melting point is more preferably 251 to 260° C., still more preferably 253 to 258° C., and particularly preferably 254 to 257° C.

Examples of such a polyester include homopolyesters, preferably homopolyethylene terephthalate and copolyesters having a relatively high melting point within the above-described melting point range (the amount of copolymerization is relatively small), and preferably copolyethylene terephthalates. In particular, homopolyethylene terephthalate is preferred in terms of preventing film chipping. Incidentally, the homopolyethylene terephthalate herein does not exclude inclusion of a diethylene glycol component that is inevitably included. Examples of a copolymerization component in such a copolyester having a relatively high melting point include copolymerization components in the copolyester described below. The type and copolymerization amount of the copolymerization components should be adjusted so as to allow the melting point to be in the range described above.

When the polyesters constituting both layer A and layer B are a polyester having a melting point in the range of more than 250° C. to 260° C. or less, the effect aforementioned is exerted better, which is preferable.
(Copolyester)
In the present invention, a preferable example of the polyester constituting layer A and/or layer B includes a copolyester having a melting point of 230° C. to 250° C. Employment of such a polyester provides an especially excellent effect of preventing both film cracks and film chipping in good balance during forming. When the melting point is high, cracks in the film tend to easily occur. On the other hand, when the melting point is excessively low, film chipping occurs due to heat generation during forming.

The copolymerization component in such a copolyester may be an acid component or an alcohol component. Examples of the acid components include aromatic dicarboxylic acids other than the main acid component, such as isophthalic acid, phthalic acid, terephthalic acid, and 2,6-naphthalenedicarboxylic acid, and aliphatic dicarboxylic acids, such as adipic acid, azelaic acid, and sebacic acid. Examples of the alcohol components include aliphatic diols, such as 1,6-hexanediol, and alicyclic diols, such as 1,4-hexamethylene dimethanol. These may be used singly, or two or more of these can be used in combination. Of these, isophthalic acid and sebacic acid are preferred, and isophthalic acid is particularly preferred.

With respect to the copolymerization proportion of the copolymerization component of the copolyester described above, in the case of layer A, the proportion should be such that the melting point of the copolyester (TmA) is in the range of 230 to 250° C., preferably 235 to 250° C., more preferably 238 to 250° C., and still more preferably 238 to 249° C. When this melting point is low, chipping occurs due to heat generation during forming processing, and thus it is not preferable. On the other hand, when the melting point is higher than this range, the crystallinity of the copolyester tends to be high, and thus the improving effect of the formability becomes low and cracks easily occur.

In the case of layer B, the proportion should be similarly such that the melting point of the copolyester (TmB) is in the range of 230 to 250° C., preferably 235 to 250° C., more preferably 238 to 250° C., and still more preferably 242 to 250° C. When this melting point is low, heat resistance becomes poor, and layer B becomes easily flowed and deformed due to heat generation during forming, thereby causing defects easily. When layer B is on the film surface, chipping occurs. On the other hand, when the melting point is higher than this range, the crystallinity of the copolyester tends to be high, and thus the improving effect of the formability becomes low and cracks easily occur.

When the polyesters constituting both layer A and layer B are a copolyester having a melting point in the range of 230 to 250° C., the effect mentioned above is exerted better, which is preferable.

So long as the melting points after film formation are within the above ranges in the copolyesters each constituting layer A and layer B, a copolyester may be employed singly, or in a blend of a copolyester and a homopolyester as resin raw material of either layer. Of these, in terms of formability during forming to a can and stability of film quality, a method employing the former is preferable. In particular, it is preferable to use a copolyester only as resin raw material for both layer A and layer B.

In the case of using a resin raw material composed of a blend of a copolyester and a homopolyester, the amount of the homopolyester is preferably in the range of 30 to 60 wt % based on the total amount of the polyester constituting each layer.

Further, in order to achieve excellent processability such that even under severe conditions of forming, no chipping, cracking, or the like occurs on the can wall portion, the biaxially drawn polyester film of the invention is subjected to heat treatment in the course of a series of can manufacturing steps for the purpose of relaxing the stress accompanying the strain applied to the film of the laminated metal sheet. Thus, |TmB−TmA|, the difference in the melting points between layer A and layer B, is required to be 4° C. or less. A difference in the melting points more than 4° C. is not preferable because, during the heat treatment, the residual stress at the time of can forming is relaxed in layer B (contraction) while layer A melts and flows, resulting in a film surface with a poor appearance.

Here, the melting point of a copolyester is measured by a method in which the melting peak is determined at a heating rate of 20° C./minute using TA Instruments Q100 DSC. In this case, the sample amount should be about 20 mg.
(Intrinsic Viscosity)

Subsequently, the intrinsic viscosity of the polymer portion of layer A and layer B in the present invention is necessarily 0.46 or more, preferably 0.49 or more, more preferably 0.52 or more, still more preferably 0.54 or more, particularly preferably 0.55 or more, and most preferably 0.56 or more. When the intrinsic viscosity is low, breakage frequently occurs during film drawing. Additionally, the film obtained easily causes breakage during forming to a can after lamination on a metal sheet. A high intrinsic viscosity is preferable in terms of formability, but an extremely high intrinsic viscosity may lead to problems such as reduction in the productivity. From such a viewpoint, the intrinsic viscosity is, for example, preferably 0.80 or less, more preferably 0.75 or less, and still more preferably 0.70 or less.

The intrinsic viscosity of the polymer portion of layer A and layer B herein is a value obtained by dissolving a resin composition for forming each layer in o-chlorophenol, then removing a coloring pigment and the like by a centrifuge, and performing measurement in the solution at 35° C.
(Contact Angle)

In the present invention, the water contact angle on the outer surface of layer A is required to be 70 to 120° with respect to the formability on a can in which a severer load is applied to the film. This can prevent chipping of the film even during forming processing in which a severer load is applied. When the contact angle does not reach the lower limit, film chipping occurs during forming processing on the can in which a severer load is applied to the film. From such a viewpoint, the contact angle is preferably 73° or more, more preferably 75° or more, still more preferably 77° or more, and particularly preferably 79° or more. On the other hand, a film having a contact angle exceeding the upper limit is not preferred because the adhesion deteriorates in a laminate when layer A is laminated on a metal sheet, and the printability after can formation deteriorates when layer A becomes the outer surface of the can.

Furthermore, there occurs a problem on windability of the film due to its excessive slipping. From such viewpoints, the contact angle is preferably 110° or less, more preferably 105° or less, still more preferably 100° or less, particularly preferably 95° or less, and most preferably 90° or less.
(Wax)

In the present invention, in order to allow the water contact angle to be within such a range, the polyester composition constituting layer A preferably contains wax. Examples of the wax include vegetable waxes such as carnauba wax, candelilla wax, rice wax, Japan wax, jojoba oil, palm wax, rosin-modified wax, ouricury wax, sugar cane wax, esparto wax, and bark wax; animal waxes such as bees wax, lanolin, whale wax, privet wax, and shellac wax; mineral waxes such as montan wax, ozocerite, and ceresin wax; petroleum-based waxes such as paraffin wax, microcrystalline wax, and petrolatum; and synthetic hydrocarbon-based waxes such as Fischer-Tropsch wax, polyethylene wax, polyethylene oxide wax, polypropylene wax, and polypropylene oxide wax. Of these, polyethylene wax is particularly preferred because of its handleability. Furthermore, the polyethylene wax has a dropping point of preferably 120 to 140° C. With a dropping point within this range, the polyethylene wax becomes easily exposed on the surface of the film during can manufacturing steps, and thus the lubricity of the film surface is improved, thereby being hard to cause chipping during forming in which a severer load is applied to the film. The dropping point is more preferably 125 to 140° C. and still more preferably 130 to 140° C.

The amount of the wax for achieving the water contact angle is preferably 0.2 wt % or more, more preferably 0.5 wt % or more, more preferably 0.8 wt % or more, still more preferably 0.9 wt % or more, particularly preferably 0.95 wt % or more, and most preferably 1.0 wt % or more, and also preferably 3.5 wt % or less, more preferably 3.3 wt % or less, still more preferably 3.0 wt % or less, particularly preferably 2.5 wt % or less, and most preferably 2.2 wt % or less, based on the weight of layer A.

(Coloring Pigment)

In the present invention, layer B contains a coloring pigment, and the amount of the coloring pigment is required to be more than 10 wt % and 50 wt % or less, preferably 15 to 40 wt %, and particularly preferably 15 to 30 wt %, based on the weight of layer B. When the amount of the coloring pigment is 10 wt % or less, the concealability is poor. When the amount exceeds 50 wt %, not only the effect for improving concealability is saturated, but also the film becomes fragile, thereby making the film easily broken during film drawing, and further the film obtained is easily cracked and broken during forming into a can after lamination on a metal sheet, which is not preferred. The coloring pigment to be contained in layer B may be inorganic or organic, but is preferably inorganic. Preferred examples of inorganic pigments include alumina, titanium dioxide, calcium carbonate, and barium sulfate. Of these, titanium dioxide is preferred.

Layer A may or may not contain a coloring pigment as long as the object of the present invention is not disturbed. When a coloring pigment is contained, the amount should be 10 wt % or less based on the weight of layer A. With an excessive amount of the coloring pigment in layer A, when the film is formed into a can or the like after laminated on the metal sheet and the forming is under severe conditions, cracks tend to easily occur in the can wall portion. Moreover, the film becomes brittle, and film breakage tends to easily occur during film drawing. From such viewpoints, the amount is more preferably 5 wt % or less, still more preferably 3 wt % or less, and particularly preferably 1 wt % or less. As the most preferable embodiment in the present invention, there can be provided an embodiment in which layer A substantially contains no coloring pigment. The expression "substantially contains no coloring pigment" as referred to herein means that, for example, particles such as titanium dioxide (being a coloring pigment as well as serving as a slip agent) may be contained, for the purpose of imparting surface smoothness, in a small amount such as 0.05 wt % or less, preferably 0.03 wt % or less, and still more preferably 0.01 wt % or less, based on the weight of layer A. Particularly, no coloring pigment is preferably contained. Thus, even in the forming under severe processing conditions as mentioned above, it is possible to further prevent cracks on the can wall portion and thus to further reduce surface defects. Additionally, it is possible to further prevent the film from becoming brittle and to further prevent film breakage during film drawing.

(Other Additives)

Other additives such as a fluorescent brightener, an antioxidant, a heat stabilizer, an ultraviolet absorbent, and an antistatic agent can be added to layer A and layer B, as required, as long as the object of the present invention is not disturbed. For improving whiteness in particular, a fluorescent brightener is effective.

(Thickness)

The thickness of the biaxially drawn polyester film can be appropriately changed as required, but the total thickness is suitably in the range of 6 to 75 μm, especially preferably in the range of 10 to 75 μm, and particularly preferably in the range of 15 to 50 μm. When the thickness is less than 6 μm, chipping or the like easily occurs during forming. On the other hand, films having a thickness of more than 75 μm are over-quality and uneconomical.

Further, the thickness ratio between layer A and layer B (XA/XB: wherein XA is a total thickness of layer A, and XB is a total thickness of layer B) is preferably 0.13 to 0.43, more preferably 0.15 to 0.40, and still more preferably 0.16 to 0.35 in terms of a balance among a suitable surface contact angle, formability, and concealability.

(Production Method)

The method for producing the biaxially drawn colored polyester film for laminating and forming metal sheet of the present invention described above is not particularly limited, and may be such that an undrawn laminate sheet is first produced by a conventionally known film forming method followed by drawing the sheet bi-directionally.

For example, a polyester composition for layer A is prepared by adding wax to a polyester. After being sufficiently dried, the composition is melted in an extruder at a temperature ranging from the melting point to (melting point+70)° C. The melting point in this case is the melting point of the polyester used. At the same time, a polyester composition for layer B is prepared by adding a coloring pigment to a polyester. After being sufficiently dried, the composition is fed to another extruder and melted at a temperature ranging from the melting point to (melting point+70)° C. Subsequently, by a method in which the two molten resins are laminated in a die, such as a simultaneous lamination extrusion method using a multi-manifold die, an undrawn laminated sheet is produced. According to the simultaneous lamination extrusion method, a melt of the resin to form one layer and a melt of the resin to form another layer are laminated in a die and, while maintaining the laminated state, are formed into a sheet through the die.

Next, the undrawn laminated sheet is sequentially or simultaneously biaxially drawn and then heat-set, thereby yielding the film. In the case where the film is formed by sequential biaxial drawing, the undrawn laminated sheet is heated by roll heating, infrared heating, or the like, then first drawn in the longitudinal direction, and next drawn in the lateral direction using a stenter. At this time, the drawing temperature should be 20 to 50° C. higher than the glass transition point (Tg) of polyester (preferably, the polyester of layer A). The longitudinal draw ratio should be in the range of 2.0 to 5.0, preferably 2.2 to 4.0, and more preferably 2.5 to 3.6, and the lateral draw ratio should be in the range of 2.5 to 5.0, preferably 2.6 to 4.0, and more preferably 2.6 to 3.7. The temperature of heat setting is preferably selected in the range of 150 to 240° C. and preferably 150 to 230° C. depending on the melting point of the polyester so as to adjust the film quality.

(Applications)

The biaxially drawn colored polyester film for laminating and forming metal sheet of the present invention is suitably used in applications for lamination on the surface of a metal sheet that will become the outer surface of a container. This is because printability is not usually required in the inner surface of the container.

As a metal sheet on which the biaxially drawn colored polyester film for laminating and forming metal sheet of the present invention is laminated, particularly as a metal sheet for can manufacturing, a sheet of tin, tin-free steel, aluminum, or the like is suitable. Lamination on a metal sheet can be performed, for example, by a method in which the metal sheet is heated to a temperature equal to or higher than the melting point of the film (the melting point of a polyester constituting the layer of the film in contact with the metal sheet), then the film is laminated on the metal sheet, followed by cooling, and the layer of the film to be in contact with the metal sheet is amorphized and fused thereto. In this case, a polyester film for laminating the inner surface of the can is also laminated on the other surface of the metal sheet and fused thereto at the same time. In this case, when the film has a two-layer structure of layer A/layer B, layer B becomes in contact with the metal sheet. When the film has a three-layer structure of layer A/layer B/layer A, any one of the layers A becomes in contact with the metal sheet. Similarly, even in other lamination structure, any structure may be applied as long as layer A forms a film surface layer on the opposite side of the metal sheet. A layer forming the surface layer on the opposite side of layer A, forming such a surface layer of the film, is on the side laminated on the metal sheet.

In this manner, the metal sheet is laminated on the both surfaces by the polyester film for laminating the outer surface of a can and the polyester film for the inner surface of a can, and then formed into a metal can or the like by drawing and ironing in several stages. During the above stages, for the purpose of reducing damage to the film in a subsequent forming processing after relaxing the stress accompanying the strain applied to the film of a laminated metal sheet, heat treatment is performed in the course of a series of can manufacturing steps. The present invention provides an excellent appearance even after the heat treatment is performed.

EXAMPLES

Hereinafter, the invention will be described in detail with reference to examples. However, the invention is not limited only to these examples. The characteristic values were measured by the following methods. In addition, unless otherwise particularly noted, "part" and "%" in the examples means "part by weight" and "wt %".
(Melting Point)
The melting point of a polyester was measured by taking about 20 mg of a sample from each layer of a film and determining the melting peak while the temperature was raised at a temperature rising rate of 20° C./minute using TA Instruments Q100 DSC.
(Dropping Point)
The dropping point was measured in accordance with DIN 51801/2 (° C.) using an Ubbelohde dropping point instrument.
(Intrinsic Viscosity)
The intrinsic viscosity is obtained by dissolving a resin composition collected from the extruder in o-chlorophenol, and then removing the coloring pigment and the like by a centrifuge, and performing measurement in a solution at 35° C. The unit is dl/g.

(Water Contact Angle)
The contact angle was measured using a contact angle meter manufactured by Kyowa Interface Science Co., Ltd. A film sample was place in an environment of a temperature of 25° C. and a humidity of 50% for 24 hours or more. Then, 5 mg of distilled water was dropped on the film, and a photograph was taken after 20 seconds from the horizontal direction. An angle formed on the water droplet side by the film and the tangent of the water droplet is taken as the contact angle.
(Formability)
A sample film was laminated on one side of a tin-free steel sheet having a thickness of 0.230 mm heated to a temperature equal to or higher than the melting point (approximately, melting point+10° C.) of the polyester of layer B (the surface laminated on the metal sheet) for a two-layer structure sample, or equal to or higher than the melting point (approximately, melting point+10° C.) of the polyester of layer A, which is the surface laminated on the metal sheet for a three-layer structure sample. After water cooling, the laminate sheet was cut into a 150-mm-diameter disc and subjected to five-stage drawing and ironing using a die and a punch, thereby preparing a 55-mm-diameter container having no seam on the side surface. With respect to this can, from the occurrence of chipping and cracks of the polyester film layer on the can wall, the formability was evaluated based on the following criteria.
[Chipping]
Excellent: No film chipping is observed.
Good: Film chippings are slightly observed.
Fair: Small chippings are observed in the film.
Poor: Large chippings are observed in the film.
[Cracks]
Excellent: No crack is observed in the film.
Good: Minute cracks are observed in the film.
Fair: Small cracks are observed in the film.
Poor: Large cracks are observed in the film.
(Concealability)
Using the can body obtained as above, the can barrel was visually observed, and the concealability was evaluated based on the following criteria.
Excellent: Color of the metal sheet base cannot be seen at all. This sample exhibits excellent concealability.
Good: Substantially color of the metal sheet base cannot be seen at all. This sample exhibits good concealability.
Fair: The color of the metal sheet base can be slightly seen. Concealability is slightly poor.
Poor: The color of the metal sheet base can be seen. Concealability is poor.
(Film Forming Stability)
The film forming stability during film forming was observed and evaluated based on the following criteria.
Good: No film breakage occurs, allowing for extremely stable film forming. No breakage occurs for at least four days.
Fair: Breakage sometimes occurs, and film forming is unstable. Breakage frequency is (once/four days) or more and less than (once/day).
Poor: Breakage frequently occurs, and stable film forming is substantially impossible.
Breakage frequency is (once/day) or more.
(Appearance After Heat Treatment)
A can having good formability was maintained in an oven at 235 to 255° C. for 90 seconds, and then the appearance of the can was evaluated based on the following criteria.
Good: No appearance defects are observed on the film surface of the can.

Poor: The film surface of the can is roughened, and appearance defects are observed.

(Printability)

A biaxially drawn film sample was laminated on a metal sheet and a can was manufactured using the sheet. To the can barrel, well-known thermosetting ink and thermosetting finishing varnish were applied and then baked and cured in a baking oven. The can obtained was cut open, and the can barrel portion was drawn flat to prepare a test piece. The test piece obtained was set to a Du Pont impact tester such that the test piece was placed with the side wall inner surface facing upward, and an impact shaft would hit at a point in the test piece corresponding to a can height of 90 mm from the tread portion of the can. The impact shaft weighed 300 g and its tip sphere had a diameter of ⅜ inches. The impact shaft was allowed to fall from a height of 50 mm so that the outer surface side of the can was formed to protrude outward.

To thus-formed outer surface side of the can, a piece of cellophane tape (manufactured by Nichiban Co., LTD.) was attached and peeled off twice. For each of five cans obtained, this measurement was performed at two points per can. The total area from which the ink was peeled off was evaluated based on the following criteria.

Good and Fair represent tolerable ranges.
  Good: The peeled area was less than 20%.
  Fair: The peeled area was 20% or more and less than 40%.
  Poor: The peeled area was 40% or more.

Examples 1 to 10 and Comparative Examples 1 to 7

The polyester composition for layer A and the polyester composition for layer B show in Table 1 were separately dried and melted at 270° C. for layer A and at 280° C. for layer B. Then, the compositions were laminated by means of a three-layer feed block into a three-layer structure of A/B/A, co-extruded from an adjacent die, and rapidly cooled and solidified to give an undrawn laminate film. Next, this undrawn film was longitudinally drawn at 100° C. at a draw ratio of 3, then laterally drawn at 130° C. at a draw ratio of 3, and subsequently heat-set at 165° C. to give a biaxially drawn polyester film.

As a coloring pigment, rutile titanium dioxide (average particle size: 0.5 μm) was used. As a wax, a polyethylene wax having a dropping point of 135° C. was used. The evaluation results of the biaxially drawn polyester films obtained are shown in Table 2.

Examples 11 to 20 and Comparative Examples 8 to 14

A biaxially drawn polyester film was obtained in the same manner as in Example 1 except that the composition was laminated into two-layer structure of A/B by means of a two-layer feed block. The evaluation results of the biaxially drawn polyester films obtained are shown in Table 2.

TABLE 1

| | Layer structure | | Total thickness | Surface layer thickness (single layer) | Surface layer (layer A) | | |
|---|---|---|---|---|---|---|---|
| | | | | | Copolyester | Coloring | |
| | | | | | Type | Melting point (° C.) | pigment Concentration (wt %) | Wax Concentration (wt %) |
| Ex. 1 | 3 layers | A/B/A | 20 | 2.5 | PET-IA4.0 | 248 | 0 | 0.3 |
| Ex. 2 | 3 layers | A/B/A | 20 | 2.5 | PET-IA4.0 | 248 | 0 | 1.0 |
| Ex. 3 | 3 layers | A/B/A | 20 | 2.5 | PET-IA4.0 | 248 | 0 | 2.2 |
| Ex. 4 | 3 layers | A/B/A | 20 | 2.5 | PET-IA4.0 | 248 | 0 | 3.3 |
| Ex. 5 | 3 layers | A/B/A | 20 | 2.8 | PET-IA4.0 | 248 | 0 | 1.2 |
| Ex. 6 | 3 layers | A/B/A | 20 | 2.4 | PET-IA4.5//PBT | 241 | 0 | 1.0 |
| Ex. 7 | 3 layers | A/B/A | 20 | 2.4 | PET-IA6//PBT | 239 | 0 | 0.9 |
| Ex. 8 | 3 layers | A/B/A | 20 | 2.5 | PET-IA4.0 | 248 | 0 | 1.0 |
| Ex. 9 | 3 layers | A/B/A | 20 | 2.5 | PET | 256 | 0 | 1.0 |
| Ex. 10 | 3 layers | A/B/A | 20 | 2.5 | PET-IA4.0 | 248 | 5.0 | 1.0 |
| Ex. 11 | 2 layers | A/B | 20 | 2.5 | PET-IA4.0 | 248 | 0 | 0.3 |
| Ex. 12 | 2 layers | A/B | 20 | 2.5 | PET-IA4.0 | 248 | 0 | 1.0 |
| Ex. 13 | 2 layers | A/B | 20 | 2.5 | PET-IA4.0 | 248 | 0 | 2.2 |
| Ex. 14 | 2 layers | A/B | 20 | 2.5 | PET-IA4.0 | 248 | 0 | 3.3 |
| Ex. 15 | 2 layers | A/B | 20 | 2.8 | PET-IA4.0 | 248 | 0 | 1.2 |
| Ex. 16 | 2 layers | A/B | 20 | 2.4 | PET-IA4.5//PBT | 241 | 0 | 1.0 |
| Ex. 17 | 2 layers | A/B | 20 | 2.4 | PET-IA6//PBT | 239 | 0 | 0.9 |
| Ex. 18 | 2 layers | A/B | 20 | 2.5 | PET-IA4.0 | 248 | 0 | 1.0 |
| Ex. 19 | 2 layers | A/B | 20 | 2.5 | PET | 256 | 0 | 1.0 |
| Ex. 20 | 2 layers | A/B | 20 | 2.5 | PET-IA4.0 | 248 | 5.0 | 1.0 |
| C Ex. 1 | 3 layers | A/B/A | 20 | 2.5 | PET-IA4.0 | 248 | 0 | 0.0 |
| C Ex. 2 | 3 layers | A/B/A | 20 | 2.5 | PET-IA4.0 | 248 | 0 | 4.0 |
| C Ex. 3 | 3 layers | A/B/A | 20 | 2.0 | PET-IA6 | 243 | 0 | 0.7 |
| C Ex. 4 | 3 layers | A/B/A | 20 | 4.0 | PET-IA12 | 228 | 0 | 1.5 |
| C Ex. 5 | 3 layers | A/B/A | 20 | 2.5 | PET-IA6 | 243 | 0 | 1.5 |
| C Ex. 6 | 3 layers | A/B/A | 20 | 2.5 | PET-IA6//PBT | 239 | 11.0 | 2.3 |
| C Ex. 7 | 3 layers | A/B/A | 20 | 2.0 | PET-IA7.2//PBT | 238 | 0 | 2.3 |
| C Ex. 8 | 2 layers | A/B | 20 | 2.5 | PET-IA4.0 | 248 | 0 | 0.0 |
| C Ex. 9 | 2 layers | A/B | 20 | 2.5 | PET-IA4.0 | 248 | 0 | 4.0 |
| C Ex. 10 | 2 layers | A/B | 20 | 2.0 | PET-IA6 | 243 | 0 | 0.7 |
| C Ex. 11 | 2 layers | A/B | 20 | 4.0 | PET-IA12 | 228 | 0 | 1.5 |
| C Ex. 12 | 2 layers | A/B | 20 | 2.5 | PET-IA6 | 243 | 0 | 1.5 |

TABLE 1-continued

| | | | | | | | | |
|---|---|---|---|---|---|---|---|---|
| C Ex. 13 | 2 layers | A/B | 20 | 2.5 | PET-IA6//PBT | 239 | 11.0 | 2.3 |
| C Ex. 14 | 2 layers | A/B | 20 | 2.0 | PET-IA7.2//PBT | 238 | 0 | 2.3 |

| | Surface layer (layer A) | | Substrate layer (layer B) | | | |
|---|---|---|---|---|---|---|
| | Water contact angle ° | Polymer portion intrinsic viscosity dL/g | Copolyester Type | Melting point (° C.) | Coloring pigment Concentration (wt %) | Polymer portion intrinsic viscosity dL/g |
| Ex. 1 | 73 | 0.57 | PET-IA3.2 | 250 | 18.0 | 0.57 |
| Ex. 2 | 79 | 0.57 | PET-IA3.2 | 250 | 18.0 | 0.57 |
| Ex. 3 | 100 | 0.57 | PET-IA3.2 | 250 | 18.0 | 0.57 |
| Ex. 4 | 119 | 0.57 | PET-IA3.2 | 250 | 18.0 | 0.57 |
| Ex. 5 | 83 | 0.54 | PET-IA3.6 | 249 | 18.0 | 0.65 |
| Ex. 6 | 80 | 0.56 | PET-IA6 | 243 | 18.0 | 0.62 |
| Ex. 7 | 78 | 0.60 | PET-IA6 | 243 | 18.0 | 0.59 |
| Ex. 8 | 79 | 0.57 | PET-IA3.2 | 250 | 30.0 | 0.51 |
| Ex. 9 | 80 | 0.57 | PET | 256 | 18.0 | 0.57 |
| Ex. 10 | 79 | 0.57 | PET-IA3.2 | 250 | 18.0 | 0.57 |
| Ex. 11 | 73 | 0.57 | PET-IA3.2 | 250 | 18.0 | 0.57 |
| Ex. 12 | 79 | 0.57 | PET-IA3.2 | 250 | 18.0 | 0.57 |
| Ex. 13 | 100 | 0.57 | PET-IA3.2 | 250 | 18.0 | 0.57 |
| Ex. 14 | 119 | 0.57 | PET-IA3.2 | 250 | 18.0 | 0.57 |
| Ex. 15 | 83 | 0.54 | PET-IA3.6 | 249 | 18.0 | 0.65 |
| Ex. 16 | 80 | 0.56 | PET-IA6 | 243 | 18.0 | 0.62 |
| Ex. 17 | 78 | 0.60 | PET-IA6 | 243 | 18.0 | 0.59 |
| Ex. 18 | 79 | 0.57 | PET-IA3.2 | 250 | 30.0 | 0.51 |
| Ex. 19 | 80 | 0.57 | PET | 256 | 18.0 | 0.57 |
| Ex. 20 | 79 | 0.57 | PET-IA3.2 | 250 | 18.0 | 0.57 |
| C Ex. 1 | 60 | 0.57 | PET-IA3.2 | 250 | 18.0 | 0.57 |
| C Ex. 2 | 130 | 0.57 | PET-IA3.2 | 250 | 18.0 | 0.57 |
| C Ex. 3 | 75 | 0.45 | PET-IA6 | 243 | 23.4 | 0.58 |
| C Ex. 4 | 88 | 0.57 | PET-IA12 | 228 | 23.4 | 0.56 |
| C Ex. 5 | 89 | 0.64 | PET-IA6 | 243 | 23.4 | 0.45 |
| C Ex. 6 | 102 | 0.64 | PET-IA6 | 243 | 23.4 | 0.59 |
| C Ex. 7 | 117 | 0.59 | PET-IA4.0 | 248 | 22.0 | 0.60 |
| C Ex. 8 | 60 | 0.57 | PET-IA3.2 | 250 | 18.0 | 0.57 |
| C Ex. 9 | 130 | 0.57 | PET-IA3.2 | 250 | 18.0 | 0.57 |
| C Ex. 10 | 75 | 0.45 | PET-IA6 | 243 | 23.4 | 0.58 |
| C Ex. 11 | 88 | 0.57 | PET-IA12 | 228 | 23.4 | 0.56 |
| C Ex. 12 | 89 | 0.64 | PET-IA6 | 243 | 23.4 | 0.45 |
| C Ex. 13 | 102 | 0.64 | PET-IA6 | 243 | 23.4 | 0.59 |
| C Ex. 14 | 117 | 0.59 | PET-IA4.0 | 248 | 22.0 | 0.60 |

Ex. 1: Example 1,
C Ex. 1: Comparative Example 1

TABLE 2

| | Formability | | | Film forming stability | Appearance after heat treatment | Printability |
|---|---|---|---|---|---|---|
| | Chipping | Cracks | Concealability | | | |
| Ex. 1 | Fair | Excellent | Good | Good | Good | Good |
| Ex. 2 | Good | Excellent | Good | Good | Good | Good |
| Ex. 3 | Excellent | Excellent | Good | Good | Good | Fair |
| Ex. 4 | Excellent | Excellent | Good | Good | Good | Fair |
| Ex. 5 | Good | Excellent | Good | Good | Good | Good |
| Ex. 6 | Good | Excellent | Good | Good | Good | Good |
| Ex. 7 | Good | Excellent | Good | Good | Good | Good |
| Ex. 8 | Good | Excellent | Excellent | Fair | Good | Good |
| Ex. 9 | Excellent | Fair | Good | Fair | Good | Good |
| Ex. 10 | Fair | Excellent | Good | Good | Good | Good |
| Ex. 11 | Fair | Excellent | Good | Good | Good | Good |
| Ex. 12 | Good | Excellent | Good | Good | Good | Good |
| Ex. 13 | Excellent | Excellent | Good | Good | Good | Fair |
| Ex. 14 | Excellent | Excellent | Good | Good | Good | Fair |
| Ex. 15 | Good | Excellent | Good | Good | Good | Good |
| Ex. 16 | Good | Excellent | Good | Good | Good | Good |
| Ex. 17 | Good | Excellent | Good | Good | Good | Good |
| Ex. 18 | Good | Excellent | Excellent | Fair | Good | Good |
| Ex. 19 | Excellent | Fair | Good | Fair | Good | Good |
| Ex. 20 | Fair | Excellent | Good | Good | Good | Good |
| C Ex. 1 | Poor | Excellent | Good | Good | Good | Good |

TABLE 2-continued

| | Formability | | Concealability | Film forming stability | Appearance after heat treatment | Printability |
|---|---|---|---|---|---|---|
| | Chipping | Cracks | | | | |
| C Ex. 2 | Excellent | Excellent | Good | Good | Good | Poor |
| C Ex. 3 | Poor | Poor | Good | Poor | Good | Good |
| C Ex. 4 | Poor | Excellent | Good | Good | Good | Good |
| C Ex. 5 | Poor | Poor | Good | Poor | Good | Good |
| C Ex. 6 | Poor | Poor | Good | Fair | Good | Fair |
| C Ex. 7 | Good | Excellent | Good | Good | Poor | Fair |
| C Ex. 8 | Poor | Excellent | Good | Good | Good | Good |
| C Ex. 9 | Excellent | Excellent | Good | Good | Good | Poor |
| C Ex. 10 | Poor | Poor | Good | Poor | Good | Good |
| C Ex. 11 | Poor | Excellent | Good | Good | Good | Good |
| C Ex. 12 | Poor | Poor | Good | Poor | Good | Good |
| C Ex. 13 | Poor | Poor | Good | Fair | Good | Fair |
| C Ex. 14 | Good | Excellent | Good | Good | Poor | Fair |

Ex. 1: Example 1,
C Ex. 1: Comparative Example 1

In Table 1, PET represents a homopolyethylene terephthalate, and PET-IAx represents an x mol % isophthalic acid-copolymerized polyethylene terephthalate. PET-IAx//PBT is a 50/50 (weight ratio) blend of an x mol % isophthalic acid-copolymerized polyethylene terephthalate and a polybutylene terephthalate.

INDUSTRIAL APPLICABILITY

The biaxially drawn colored polyester film for laminating and forming metal sheet of the present invention has excellent concealability and exhibits excellent formability such that even under severe conditions, for example, of forming into a can after lamination on a metal sheet, the film does not cause chipping or cracking on the can wall portion, and further the film has an excellent appearance after forming into a can and excellent printability. Thus, the film is suitably used for metal cans, such as beverage cans, food cans, and aerosol cans and particularly for the outer surface of these cans.

The invention claimed is:

1. A biaxially drawn colored polyester film comprising at least two layers of:
   a surface layer (layer A) mainly composed of a polyester having a melting point of 230 to 260° C., layer A having a polymer component with intrinsic viscosity of 0.46 or more, optionally having a coloring pigment with an amount of 0.05 wt % or less, and having a water contact angle on an outer surface of 70 to 120°; and
   a substrate layer (layer B) mainly composed of a polyester having a melting point of 230 to 260° C. and a coloring pigment, layer B having a polymer component with intrinsic viscosity of 0.46 or more and the coloring pigment with an amount of more than 10 wt % and 50 wt % or less;
   wherein the melting points of the polyesters of layer A and layer B satisfy the following expression (1):

$$|TmB-TmA| \leq 4° C. \tag{1}$$

wherein TmA represents the melting point of the polyester of layer A, and
   TmB represents the melting point of the polyester of layer B.

2. The biaxially drawn colored polyester film according to claim 1, wherein the polyester constituting layer B is a copolyester having a melting point of 230 to 250° C.

3. The biaxially drawn colored polyester film according to claim 1, wherein the polyester constituting layer A is a copolyester having a melting point of 230 to 250° C.

4. The biaxially drawn colored polyester film according to claim 1, wherein the polyesters constituting layer A and layer B each are a copolyester having a melting point of 230 to 250° C., and an isophthalic acid-copolymerized polyethylene terephthalate.

5. The biaxially drawn colored polyester film according to claim 1, wherein layer A contains 0.2 to 2.0 wt % of a wax based on the weight of layer A.

6. The biaxially drawn colored polyester film according to claim 5, wherein the wax is a polyethylene wax having a dropping point of 120 to 140° C.

7. The biaxially drawn colored polyester film according to claim 1, wherein the film is laminated on a surface of a metal sheet that will become the outer surface of a container.

8. The biaxially drawn colored polyester film according to claim 2, wherein the polyester constituting layer A is a copolyester having a melting point of 230 to 250° C.

9. The biaxially drawn colored polyester film according to claim 1, wherein the amount of the coloring pigment in layer A is not greater than 0.01 wt %.

10. The biaxially drawn colored polyester film according to claim 1, wherein layer A does not comprise the coloring pigment.

11. The biaxially drawn colored polyester film according to claim 1, wherein thickness of the biaxially drawn colored polyester film is 6 microns to 75 microns.

12. The biaxially drawn colored polyester film according to claim 1, wherein thickness of the biaxially drawn colored polyester film is 15 microns to 50 microns.

13. The biaxially drawn colored polyester film according to claim 1, wherein the coloring pigment in layer B comprises inorganic material.

14. The biaxially drawn colored polyester film according to claim 1, wherein the coloring pigment in layer B comprises titanium dioxide.

15. The biaxially drawn colored polyester film according to claim 1, wherein the coloring pigment in layer B comprises organic material.

16. The biaxially drawn colored polyester film according to claim 1, wherein a polyester composition for layer A is prepared by adding wax to the polyester, and the composition is melted in an extruder at a temperature ranging from the melting point of the polyester to (melting point of the polyester+70°) C.

17. The biaxially drawn colored polyester film according to claim 1, wherein layer A contains 0.2 to 3.5 wt % of a wax based on the weight of layer A.

18. The biaxially drawn colored polyester film according to claim 1, wherein layer A contains 0.5 to 3.3 wt % of a wax based on the weight of layer A.

19. The biaxially drawn colored polyester film according to claim 1, wherein layer A contains 0.8 to 3.0 wt % of a wax based on the weight of layer A.

20. The biaxially drawn colored polyester film according to claim 1, wherein layer A contains 0.9 to 2.5 wt % of a wax based on the weight of layer A.

* * * * *